Feb. 3, 1959 H. R. MARINI 2,871,623
METHOD OF BENDING GLASS
Filed Dec. 22, 1954 3 Sheets-Sheet 1

INVENTOR
HERMAN R. MARINI
BY Oscar L. Spencer
HIS ATTORNEY

Feb. 3, 1959  H. R. MARINI  2,871,623
METHOD OF BENDING GLASS
Filed Dec. 22, 1954  3 Sheets-Sheet 2
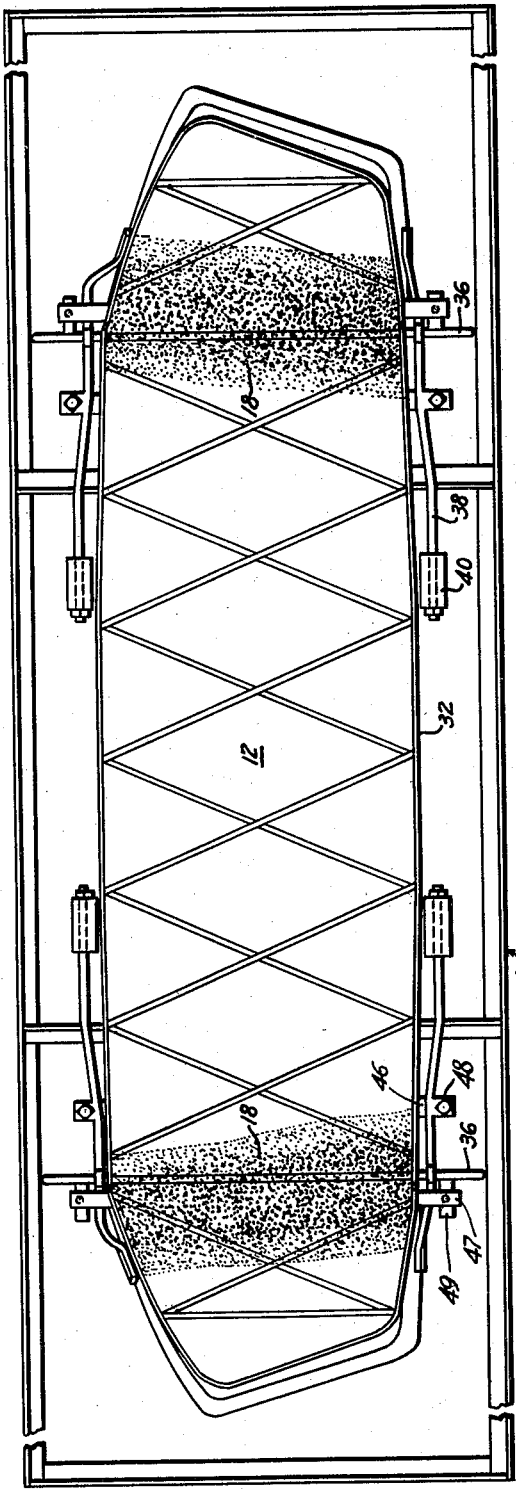
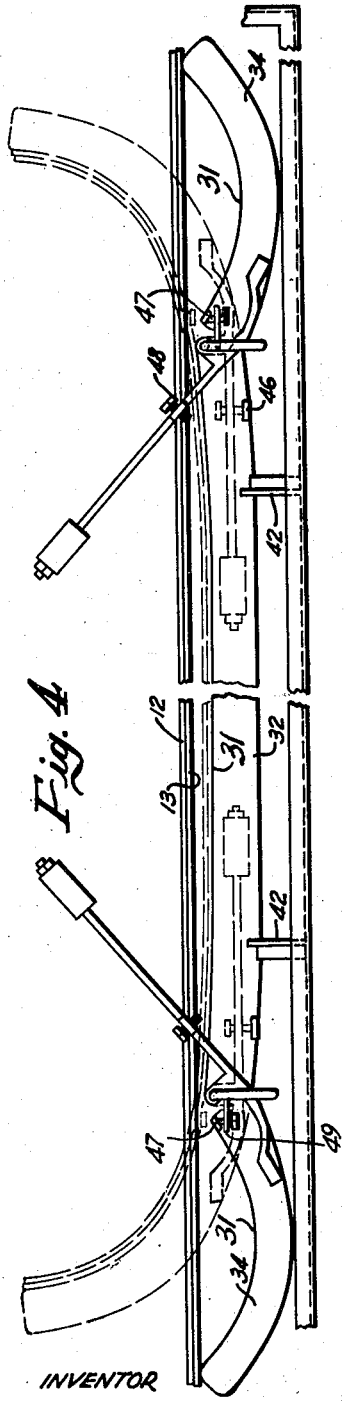
INVENTOR
HERMAN R. MARINI
BY Oscar L. Spencer
HIS ATTORNEY Feb. 3, 1959
H. R. MARINI
2,871,623
METHOD OF BENDING GLASS
Filed Dec. 22, 1954
3 Sheets-Sheet 3
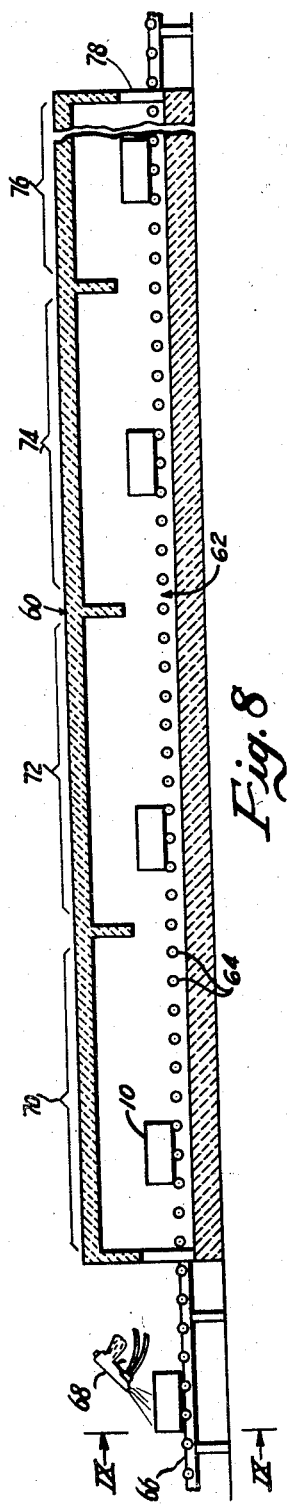
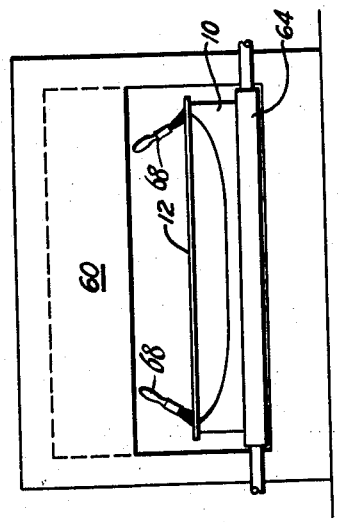
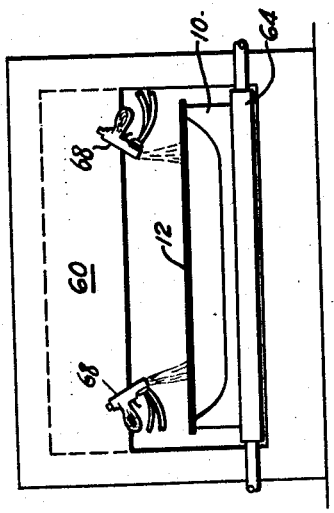
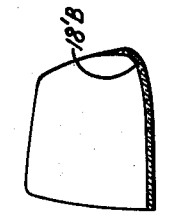
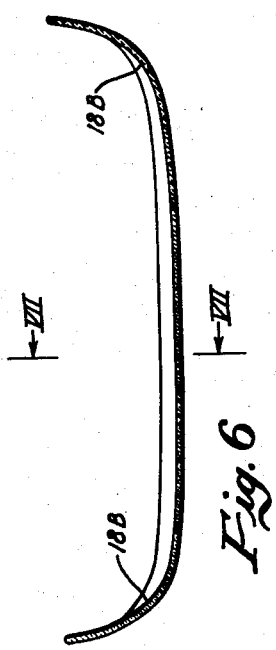
INVENTOR
HERMAN R. MARINI
BY
Oscar H. Spencer
HIS ATTORNEY United States Patent Office 2,871,623
Patented Feb. 3, 1959

2,871,623

METHOD OF BENDING GLASS

Herman R. Marini, New Kensington, Pa., assignor to Pittsburgh Plate Glass Company, Allegheny County, Pa., a corporation of Pennsylvania Application December 22, 1954, Serial No. 476,942

6 Claims. (Cl. 49—84)

This application relates to method of bending glass, and specifically refers to improvements and refinements in the method of bending glass sheets into non-uniform curvatures. In particular, this invention provides a non-uniform pattern of heat distribution for heating glass sheets more intensely in localized areas to obtain satisfactory bends of a complex nature.

Heretofore, glass bending has been accomplished by conveying glass sheets mounted on suitable molds through bending lehrs having zones of progressively increasing heat and, when the temperature has been raised to the degree required to soften the glass, allowing it to settle freely onto the surface of the mold. However, when the mold surfaces include critical portions which are relatively sharply curved, it has been found advantageous to create local zones of concentrated heat, in the general furnace heating zones, which cause more rapid softening of those critical areas of the glass that are to settle into registry with such curved areas of the mold than the remainder of the glass.

According to prior known methods, such localized heating zones have been developed by placing special gas burners or electrical heating elements in closer adjacency to those critical portions of the passing mold conveyed through the furnace than the heaters near which the less critical areas pass. Other prior art devices for intensifying the heat in these critical areas relative to other areas have included the use of reflectors to reflect the radiant energy into the critical portions of the glass desired to register with the sharply curved areas of the mold surfaces, and means for shielding the non-critical portions of the glass sheet, such as heat shields placed in the path of radiant heat flow from the heaters and the surface of the glass and spaced therefrom.

While these prior art devices and methods provide some improvement in effecting complex bending over earlier techniques, these various solutions have not been completely successful in eliminating sag from those portions of the glass sheets which are desired to be kept relatively flat, or in removing glass sagging transversely of a desired axis of curvature. These undesirable sagging effects are attributed to the necessity for providing an ambient temperature level with a bending lehr that is so high in order to produce the desired bending in the critical regions that the efficiency of the means for shielding the non-critical areas of the glass is impaired.

According to the present invention, the intensity of heat imparted to the critical areas of the glass which are destined to be curved most severely is controlled at the surface of the glass sheet to be bent by covering these areas with a film of heat absorbing material capable of disintegrating at the temperature of bending. By its presence immediately adjacent the critical areas of the glass, the heat absorbing material reradiates the absorbed heat directly into the adjacent glass to provide a more rapid heating of the glass in the critical regions wherein more severe bending is required, thus facilitating a more rapid bending of the glass in these critical areas. The film of heat absorbing material also provides additional heat to the critical regions of the glass by virtue of its oxidation as it disintegrates, thus increasing the differential between the heat supplied to the critical and non-critical areas of the glass sheet. The proximity of this film to the glass to be treated facilitates control of heating in the critical areas of the sheet.

A primary object of the present invention is to provide a novel heat sagging technique for effecting complex bends to glass in sheet form, which results in a more efficient utilization of heat than heretofore possible.

Another object of the present invention is to effect non-uniform bending of glass sheets by the local application of a heat absorbing material, capable of disintegrating at glass bending temperatures without marring the glass during its disintegration, to portions of the surface of the glass sheets desired to be bent severely.

Another object is to improve the efficiency of bending a stack of glass sheets to complex shapes simultaneously.

Still another object of the present invention is to provide a novel glass sheet bending technique capable of effecting non-uniform bends along two angularly disposed axes of the sheets.

The following description considered together with the accompanying drawings will clarify these and other objects of the present invention. The particular methods described herein are for purposes of illustration rather than limitation, reference to the latter being determined by the appended claims.

In the drawings:

Figure 3 is a top plan view of a pair of sheets similar to the sheet shown in Figure 1 mounted on a counterweighted, hinged bending mold of the skeleton type, wherein the sheets are treated according to the present invention preparatory to bending;

Figure 4 is a partial longitudinal elevational view showing the glass sheets mounted on a hinged counterweighted mold preparatory to bending as in Figure 3, and also showing in phantom the final shape assumed by the glass and the mold after bending is completed;

Figure 6 is a longitudinal sectional view showing how a sheet prepared as in Figure 5 is bent along a longitudinal axis;

Figure 7 is a transverse sectional view taken along the lines VII—VII of Figure 6 showing how the sheet prepared according to Figure 5 is bent along a transverse axis;

Figure 8 is a longitudinal elevational view showing a typical operation for performing the present invention and its relationship to a conventional glass bending lehr;

Figure 9 is a cross-sectional view along the line IX—IX of Figure 8 showing one method of applying a film according to the teachings of the present invention;

Figure 10 is a view similar to Figure 9, showing another embodiment of my invention.

Figure 1:
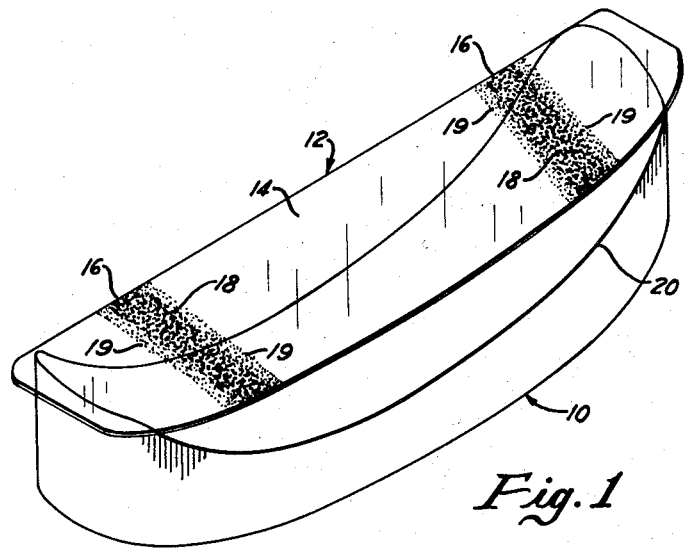
Figure 1 is a perspective view of a flat sheet of glass mounted upon a bending mold prepared according to the teachings of the present invention to be bent to a shape having sharply bent portions along its longitudinal axis.
Figure 2:
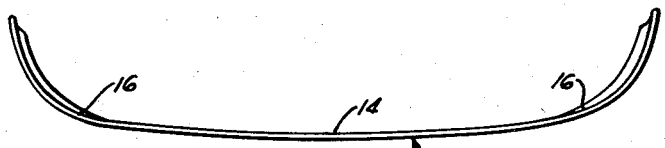
Figure 2 is a longitudinal elevational view of a glass sheet bent to a typical shape required to fabricate automobile windshields or backlights.

In Figure 1, a bending mold 10 is shown with a flat sheet of glass 12 mounted thereon preparatory to bending into a shape having a relatively flat central portion 14 merging into sharply bent areas 16. Each of the critical areas 16 is covered with a film of heat absorbing material 18. This film is preferably composed of a dark, pulverulent, light absorbing material such as carbon black, and is preferred to be tapered in thickness at its boundaries 19 to prevent too sharp a contrast in heat supplied to adjacent portions of the glass and the sharp change in stress pattern which results.

The heat absorbing material 18 is preferably applied to the critical region 16 of the upper surface of the glass sheet 12 by painting or spraying a suspension of powdered carbon black in a volatile vehicle. A typical volatile vehicle preferred is methanol, $CH_3OH$, because of its low cost and high volatility as well as its freedom from chemical reaction with glass and the heat absorbing material. However, it is understood that substitutions of other materials equally suitable for the purpose may be made without departing from the spirit of the present invention. Similarly, while pulverized carbon black is preferred because of the ease by which it is applied, its cost, its ability to absorb and reradiate absorbed heat into the glass, and its chemical properties of disintegrating by combustion at glass bending temperatures without marring the glass, other materials having such properties may be substituted.

The application of the heat absorbing material in the critical regions of the glass sheet enhances the non-uniform distribution of heat provided by the lehr heaters by virtue of the selective absorption of the radiant heat in those areas of the glass covered by the heat absorbing material. Thus, as the glass is conveyed on a bending mold through a bending lehr in the conventional manner wherein the glass loaded mold is carried along a conveyor through a bending lehr, the selective absorption of the heat in the critical regions of the glass sheet accelerates the bending in those portions, thereby enabling the glass to sag to the complex shape provided by the upper shaping surface 20 of the mold.

In bending glass sheets in pairs preparatory to their lamination with an intermediate layer of transparent plastic material to form safety windshields, the teachings of the present invention are equally applicable. The sheets are matched and then laid flat upon a bending mold with a suitable parting material separating the sheets as is well known in the art, and the critical areas of the upper sheet only are covered with the heat absorptive material. Since there is a natural tendency of the bottom sheet to separate from the top sheet during bending, the selective covering of the top sheet with heat absorptive material in the critical areas enables these areas of the top sheet to follow the sagging of the bottom sheet more closely in these areas thus facilitating more intense heating by radiation into the critical areas of the bottom sheet from the heat absorbing material than into the non-critical areas. Also, by virtue of the continued contact between the sheets in their critical regions, heat is conducted locally between the stacked sheets, thereby facilitating softening of the bottom sheet in the critical areas and enabling both members of the pair to be bent to more accurate matching relation with the mold shaping surface than has been possible before my invention.

It is understood that the non-uniform bending of glass by heat sagging techniques utilizing the novel techniques of the present invention may be utilized in conjunction with other techniques which cause a non-uniform heating of the glass sheet. These include intensifying the heat supplied by certain selected heaters radiating heat onto the critical areas of the glass, placing the selected heaters in close proximity to the critical areas or combining both techniques so that the critical areas of glass intercept a greater proportion of the heat radiated than the non-critical areas.

The present invention is also applicable for use with bending molds providing mechanical assistance to facilitate bending glass sheets when the latter are softened by the application of heat. Such an apparatus is shown in Figures 3 and 4 loaded with stacked glass sheets for lamination. Flat sheets 12 and 13 having the outline desired for the bent glass sheet are separated by a suitable parting material such as diatomaceous earth sold under the trade name Varcel. The stack is mounted on the mold and the upper sheet 12 of the stack is provided with a film 18 of heat absorbing material in its critical areas.

The mold 30 is provided with a center section 32 and movable end sections 34. The latter are each rotatable about a cross rod 36 and provided with arms 38 loaded with counterweights 40. The center section 32 is fixed to cross braces 42 which secure the mold 30 to a carrying frame 44. The end members are rotated into a spread position to support the flat glass, the heat absorbing material is applied to the critical regions of the upper sheet, and the loaded mold and frame conveyed through a conventional bending lehr. As the glass and the mold are exposed to the heat of the lehr, the glass tends to soften, thus enabling the counterweighted lever arms 38 to rotate from the solid line position to the dotted line position of Figure 4, thereby lifting the end portions of the glass and the end sections 34 of the bending mold.

The presence of the pulverulent heat absorbing material 18 on the critical regions of the glass sheet facilitates the softening of the glass in the areas where maximum bending is required by virtue of its ability to enhance the selectivity of heat absorption in the critical areas of the glass that it covers. Thus, glass bending to complex bends required for present windshields and involving severe bends near the extremities of the sheet may be accomplished more efficiently without causing undue bending of the central portion 12 of the glass sheet which is desired to be maintained relatively flat.

Of course, conventional stop members, comprising ledges 46 extending outwardly from the fixed center section 32 and adjustable screws 48 fixed to the end sections 34 and adapted to engage ledges 46 upon rotation of the latter, are provided to prevent overbending of the mold. Thus, when the adjustable screw 48 of the movable end section comes into contact with the ledge 46 of the fixed center section, rotation of the end sections 34 relative to the center section 32 is ended and the shaping surface 31 of the mold 30 provides a continuous peripheral frame conforming in outline to the shape desired for the bent glass sheet.

Also, ledges 47 and adjustable screws 49 are provided on the end sections 34 and each longitudinal extremity of the center section 32, respectively, to insure proper positioning of the mold to receive flat glass. When the ledges 47 abut the screws 49, the mold extremities are aligned in a horizontal plane to receive flat glass.

Figure 5:
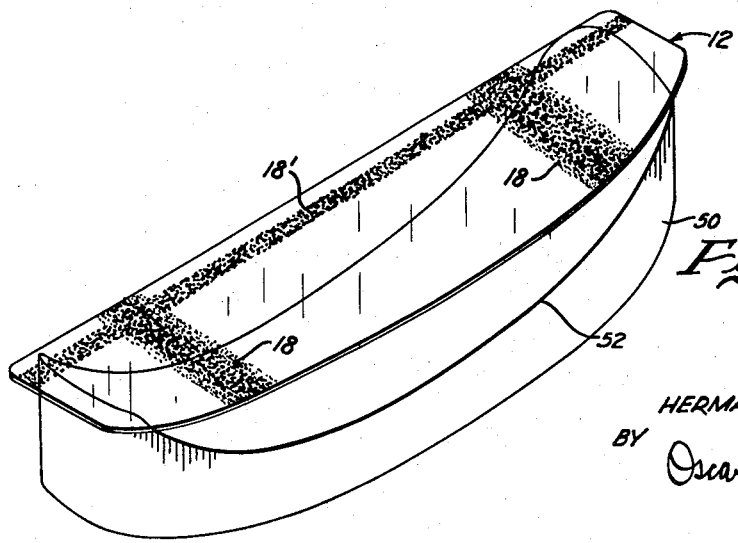
Figure 5 is a perspective view of a flat glass sheet treated according to the present invention to effect both longitudinal and transverse bending of a non-uniform nature, wherein the flat sheet is mounted on a bending mold of the type shown in Figure 1.

The present invention is also designed for use in providing complex bends along two axes disposed at an angle to each other. In Figures 5, 6 and 7, a glass bending mold 50 is shown having a frame-like shaping surface 52 defining the periphery of a sheet having a desirable bend both longitudinally and transversely thereof. In order to effect this complex bend in two directions, strips 18 of heat absorbing material are applied across the sheet adjacent its longitudinal extremities to enhance the complex longitudinal bend, whereas a strip 18' is applied lengthwise of the sheet adjacent one edge to provide a complex transverse bend. Bends 18b are depicted in Figure 6 to show the severe bending along a longitudinal axis facilitated by the application of strips 18, while bend 18'b is shown in Figure 7 to depict a typical bend along a transverse axis resulting from the application of the strip of heat absorbing material 18'.

Referring to Figs. 8, 9 and 10, typical apparatus employing the present invention is disclosed. A typical bending lehr is shown generally at 60 provided with a conveyor 62 comprising a number of spaced conveyor rolls 64. The conveyor extends from a glass loading station 66 through a dispensing station 68 where the volatile suspension is applied to the critical areas of the glass and completely through the bending lehr 60. The bending lehr comprises a preheat section 70, wherein the volatile conveyor of the suspension applied at station 68 is evaporated, a first bending section 72, wherein the pulverized carbon black absorbs and reradiates the absorbed radiant energy onto the critical areas of the glass upon which it has been applied, a second bending section 74, wherein carbon black decomposes to provide additional heat to the critical regions of the glass, and annealing section 76 wherein the glass is cooled controllably to below its annealing range before it is removed from the exit end 78 of the lehr. Of course, if the glass is to be tempered rather than annealed, the annealing section 76 is eliminated and the heated glass is passed immediately from the second heating section 74 to a tempering apparatus (not shown).

The present invention is not limited in its application with the particular bending apparatus illustrated. For example, either single glass sheets or stacks of glass sheets may be mounted on peripheral frame molds whose shaping surface consists of a continuous frame that is either convex or concave in elevation. Also, molds having a number of frame members movable to form a continuous shaping surface that is either concave or convex in elevation or any other type of glass bending molds having an upwardly directed shaping surface may be used with the present invention.

What is claimed is:

1. In the art of bending glass sheets, wherein glass is bent to non-uniform curvatures including critical regions spaced from the margin of the glass sheets where the glass is sharply curved, by mounting the glass in sheet form upon a mold having an upper shaping surface conforming in outline to the shape desired for the glass and subjecting the mounted glass to temperatures sufficient to soften the glass thus sagging the latter to the shaping surface of the mold, the improvement comprising applying to the critical regions only, a film of heat absorbing oxidizable material which oxidizes and disintegrates at the glass softening temperatures without marring the glass during its disintegration and to provide heat of oxidation, prior to subjecting the entire glass sheet to glass bending temperatures, subsequently subjecting the partially covered glass to an environment having an ambient temperature in the glass softening range, and oxidizing and disintegrating the heat absorbing oxidizable material to produce heat of oxidation at said critical regions and thereby apply additional heat to the glass in said critical regions.

2. In the method according to claim 1 wherein the heat absorbing material is applied as a pulverized suspension in a volatile conveyor.

3. The improvement according to claim 1 wherein the heat absorbing material is a suspension of pulverized carbon black in a volatile conveyor.

4. A method of bending glass sheets into complex curved shapes having critical areas spaced from the margin of the glass sheets whose curvature along an axis is more severe than other areas along said axis, comprising placing the glass in sheet form upon a mold having a complex shaping surface conforming to that desired for a curved glass sheet, applying a heat absorbing material, capable of disintegration at glass softening temperatures without marring the glass during its disintegration, in the form of a thin, tapered strip to each critical area of the surface of the glass mounted upon the mold, the thickness of each portion of said strip varying with the degree of curvature desired for the portion of the critical area it covers, and exposing the glass so treated to glass softening temperatures, whereby the critical areas of the glass are heated to higher temperatures than its remainder, thus accelerating the bending in those areas of the glass to conform the shape of the glass to that of the complex shaping surface of the bending mold.

5. In the art of bending glass sheets into shapes having non-uniform curvatures along a plurality of angularly disposed axes including critical regions spaced from the margin of said glass sheets where the glass is curved sharply, involving heating the glass sheets to glass bending temperatures to sag the latter onto the shaping surface of a mold, the improvement comprising applying a film of heat absorptive oxidizable material which oxidizes and disintegrates at glass bending temperatures without marring the glass during its disintegration and to provide heat of oxidation, to the critical regions of the surface of the glass intersecting the various axes, prior to subjecting the entire glass sheets to glass bending temperatures, subsequently subjecting the partially covered glass to an environment having an ambient temperature in the glass softening range, and oxidizing and disintegrating the heat absorbing oxidizable material to produce heat of oxidation at said critical regions and thereby apply additional heat to the glass in said critical regions.

6. In the method of bending glass sheets to non-uniform curvatures including critical regions spaced inwardly from the margin of the glass sheets where the sheets are bent to extremely sharp bends prior to lamination wherein the sheets are separated by a suitable parting material, stacked upon a mold having an upper shaping surface conforming in contour to the outline desired for the bent glass sheets, and the glass and mold are exposed to glass bending temperatures to enable the glass sheets to sag into conformity with the shaping surface, the improvement comprising applying to the critical regions of the upper surface of the topmost glass sheet of the stack a layer of heat absorbing oxidizable material which oxidizes and disintegrates at glass bending temperatures without marring the glass during its disintegration and to produce heat of oxidation, subsequently subjecting the partially covered glass to an environment having an ambient temperature in the glass softening range, and oxidizing and disintegrating the heat absorbing oxidizable material to produce heat of oxidation in said critical regions and thereby applying additional heat to the glass in said critical regions.

References Cited in the file of this patent

UNITED STATES PATENTS

| 1,910,549 | Junker | May 23, 1933 |
| 2,292,684 | Blau | Aug. 11, 1942 |
| 2,314,325 | Binkert | Mar. 23, 1943 |
| 2,389,360 | Guyer et al. | Nov. 20, 1945 |
| 2,450,297 | Pearse et al. | Sept. 28, 1948 |
| 2,691,854 | Rugg | Oct. 19, 1954 |

UNITED STATES PATENT OFFICE

CERTIFICATE OF CORRECTION

Patent No. 2,871,623  February 3, 1959

Herman R. Marini

It is hereby certified that error appears in the printed specification of the above numbered patent requiring correction and that the said Letters Patent should read as corrected below.

Column 1, line 57, for "level with" read -- level within --.

Signed and sealed this 28th day of July 1959.

(SEAL)
Attest:

KARL H. AXLINE
Attesting Officer

ROBERT C. WATSON
Commissioner of Patents